July 8, 1969    W. W. HINZ ET AL    3,454,032
COMBINATION SHUTOFF, ANTIBACKFLOW AND VACUUM RELIEF VALVE
Filed Jan. 31, 1967

WALTER W. HINZ
ALI MARANDI
INVENTORS

BY *Lyon+Lyon*
ATTORNEYS

3,454,032
COMBINATION SHUTOFF, ANTIBACKFLOW AND VACUUM RELIEF VALVE

Walter W. Hinz, Claremont, and Ali Marandi, Azusa, Calif., assignors to Clemar Manufacturing Corp., Glendora, Calif., a corporation of California
Filed Jan. 31, 1967, Ser. No. 612,867
Int. Cl. E03c *1/10;* F16k *15/18, 45/00*
U.S. Cl. 137—218                    3 Claims

ABSTRACT OF THE DISCLOSURE

A valve which is provided with two valve elements one of which functions as a shutoff valve and the other of which functions as an antibackflow valve.

---

This invention is directed to a combination shutoff, antibackflow and vacuum relief valve, and included in the objects of this invention are:

First, to provide a valve which, incorporates a control valve element that, under normal conditions, functions as a conventional shutoff valve capable of adjustment from an off position through any selected intermediate position to a full on position; however, should a condition develop when the valve is open or partially open, in which the pressure at the normally downstream side exceeds the pressure at the normally upstream side, the control valve element automatically closes and functions as an antibackflow valve.

Second, to provide a valve of this type which incorporates a novel vacuum relief valve element mounted coaxially with the control valve element, and so arranged that under normal conditions of operation, occupies a closed position during flow through the control valve, and occupies an open position venting the line downstream of the valve when the control valve is closed, and further occupies an open position should a vacuum condition develop upstream of the control valve and the control valve should fail to close thus preventing backflow.

Third, to provide a valve structure wherein a shutoff or control valve element functioning also as a backflow preventing valve element, and a vacuum relief valve element functioning also as a backup or redundant backflow preventing valve element, are mounted on a common axis, the control valve element being limited in its opening movement by a handle and stem whereas the vacuum relief valve floats freely between the control valve element and a vent port capped by the valve operating handle.

Fourth, to provide a combination shutoff, antibackflow and vacuum relief valve which is particularly compact involves a minimum of parts and is inherently economical of manufacture, yet dependably performs the multiple functions required.

With the above and other objects in view, as may appear hereinafter, reference is directed to the accompanying drawings in which.

Figure 1:
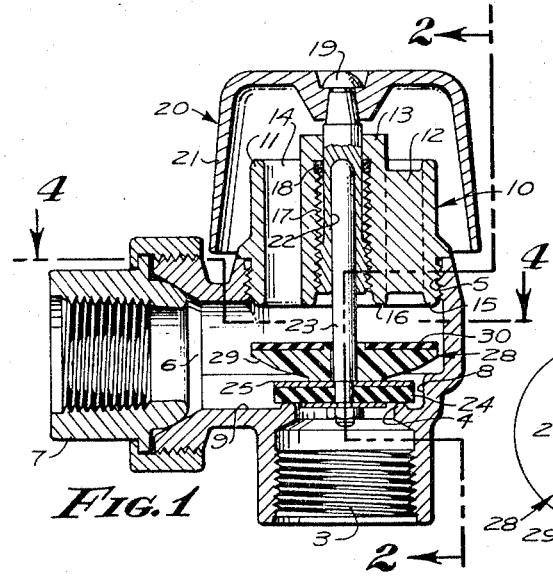
FIGURE 1 is a sectional view, showing one form of the combination shutoff, antibackflow and vacuum relief valve, taken in the plane of the common axis of the inlet and outlet; the shutoff valve element being shown in its closed position, and the vacuum relief valve element being shown in its open position.
Figure 3:
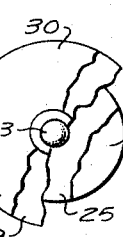
FIGURE 3 is a top view of the vacuum relief valve element with portions broken away.

Reference is first directed to the construction shown in FIGURES 1 through 4. The valve, here illustrated, includes a valve body 1, which forms a valve chamber 2, the lower side of which communicates with an inlet port 3, terminating in an upwardly facing valve seat 4. The inlet port is internally screwthreaded for connection to a water supply line.

The opposite or upper side of the valve chamber is provided with an internally screwthreaded valve bonnet opening 5. At one lateral side, the valve chamber communicates with a side outlet port 6, to which is attached a suitable outlet fitting 7, having internal screwthreads for connection to a discharge line.

The bottom side of the valve chamber 2 is provided with a restricted recess 8, surrounding the valve seat 4. The recess 8 communicates with a side channel 9, leading to the outlet port 6.

The valve bonnet opening 5 receives a cylindrical bonnet 10, which includes an outer member 11, which is externally screwthreaded for cooperation with the internal screwthreads of the opening 5. Concentrically located, with respect to the outer member 11, and connected thereto by webs 12, is an inner member 13. The annular space formed between the members 11 and 13 forms a vent port 14. The lower extremity of the outer member 11, facing into the chamber 2, forms a radially outer valve seat 15; whereas the lower extremity of the inner member 13 forms a radially inner valve seat 16. The valve seats 15 and 16 are co-planar.

The inner member 13 forms a bore, having screwthreads 17, and receives a seal ring 18. The bore formed by the inner member receives a valve actuator 19, having screwthreads cooperating with the screwthreads 17. Attached to the outer end of the actuator 19, is a handle 20, in the form of an inverted cup; that is, the handle member is provided with an annular skirt 21, which encloses the outer portion of the bonnet 10.

The actuator 19 is provided with a downwardly opening recess 22, which receives a valve stem 23. Mounted at the lower end of the valve stem is a control or shutoff valve element 24, formed of rubber, or the like, and retained between washers 25 and 26 by means of a nut 27. The valve element 24 engages the valve seat 4.

Slidably mounted for free movement on the valve stem 23 is a vacuum relief or vent port valve element 28. The valve element 28 includes a mounting disk 29, which tapers toward its peripheral portion. Cemented to or otherwise mounted on the disk 29 is a valve washer 30, of relatively soft rubber or other elastomer. The mounting disk 29 is preferably formed of a lightweight plastic material, approximately, or less than, the density of water. The valve washer simultaneously engages the valve seats 16 and 15.

Operation of the valve structure, shown in FIGURES 1 through 4, is as follows:

Normally, the valve functions as a shutoff or control valve. That is, adjustment of the handle 20 permits the water below the valve element 24 to open the valve element a distance determined by the position of the actuator 19 within the inner member 13.

Figure 2:
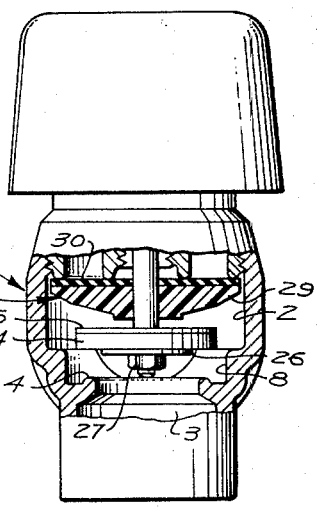
FIGURE 2 is a partial sectional, partial elevational view, taken substantially through 2—2 of FIGURE 1, showing the shutoff valve element in its fully open position, and the vacuum relief valve element in its closed position.
Figure 4:
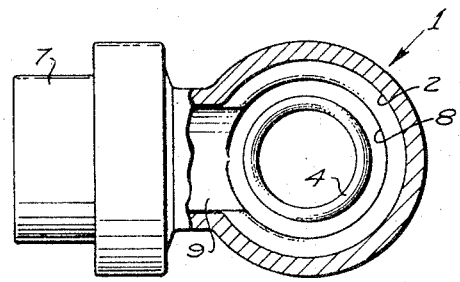
FIGURE 4 is a partial plan, partial sectional view, taken substantially through 4—4 of FIGURE 1.

Under this condition of normal operation, the water pressure within the valve chamber 2 is higher than atmospheric pressure outside the valve body. As a consequence, the internal water pressure forces the vacuum relief or vent port valve element 28 to its closed position, as shown in FIGURE 2.

Should a vacuum develop in the line upstream of the inlet valve element 24, the inlet valve element will tend to remain closed irrespective of the position of the handle. The valve element 28 will be open under these conditions.

Should the valve 24 leak, a negative pressure will develop in the valve chamber 2, and the valve element 28 will function as a vacuum relief valve or anti-siphon valve and open.

The restricted recess 8 forms with the inlet valve a restricted flow passage which increases the pressure differential across the inlet valve thereby increasing the force tending to hold the valve in any of its open positions.

Figure 7:
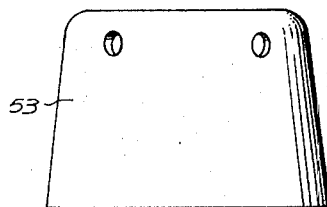
FIGURE 7 is a partial side view, partial sectional view, taken substantially through 7—7 of FIGURE 5, showing the shutoff valve element in its open position, and the vacuum relief valve element in its closed position.
Figure 5:
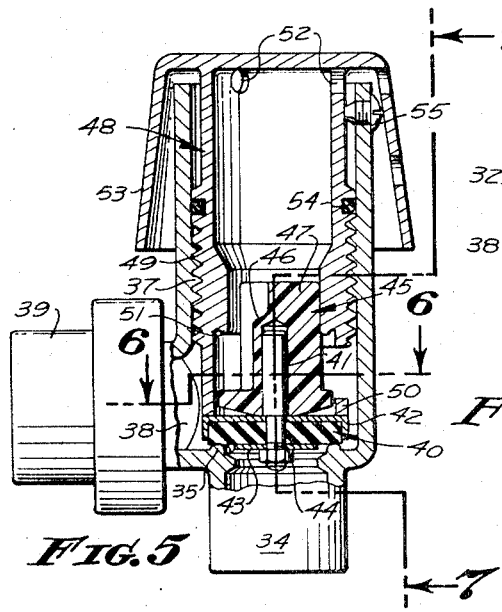
FIGURE 5 is a partial sectional, partial side elevational view, showing a modified form of the combination shutoff, antibackflow and vacuum relief valve. The sectional portions being taken in the common plane defined by the axes of the inlet and outlet; the shutoff valve element being shown in its closed position, and the vacuum relief valve element being shown in its open position.
Figure 6:
FIGURE 6 is a fragmentary sectional view, taken through 6—6 of FIGURE 5.

Reference is now directed to FIGURES 5, 6, and 7, which illustrate a modified form of the combination shutoff, antibackflow and vacuum relief valve. The modified construction includes a valve body 32 having a cylindrical valve chamber 33 at the lower end of which is an inlet 34. The inlet terminates in an upwardly directed valve seat 35 concentrically located in the valve chamber 33. The valve body continues upwardly from the valve chamber 33 to form an integral valve body extension 36, the lower portion of which is provided with internal screwthreads 37. The valve chamber is provided with a side outlet 38 which receives an outlet fitting 39, similar to the outlet fitting 7.

The inlet valve seat 35 is engaged by the control or shutoff valve element 40 which is secured to a short stem 41 between washers 42 and 43 by a nut 44.

The valve stem 41 slidably supports a vacuum relief valve element 45 which is provided with a stem receiving boss 46 having a socket into which the stem 41 extends. The boss 46 is provided with guide ribs 47.

The valve bonnet extension 36 receives a tubular valve actuator 48 having an externally screwthreaded portion 49 cooperating with the screwthreads 37. The lower portion of the valve actuator is provided with a laterally apertured skirt 50 which extends into the valve chamber 33 and engages the upper washer 42 covering the control or shutoff valve element 40. The skirt clears the vacuum relief valve element 45. At the upper or attached end of the skirt, the valve actuator 48 is provided with a vacuum relief valve seat 51. The upper extremity of the valve actuator 48 is provided with one or more vent ports 52. Secured to the upper end of the valve actuator 48 is a handle 53 in the form of an inverted cup. A seal ring 54 is provided between the valve actuator 48 and the valve bonnet extension 36. The stop screw 55 limits upward travel of the valve actuator.

The operation of the modified combination shutoff, antibackflow and vacuum relief valve is the same as the first described structure.

It should be noted that while the valves are illustrated as manually operated, the actuator 19 or 48 may be connected to a solenoid or other electrical or hydraulic operating mechanism capable of linear or rotary movement.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:
1. A valve comprising:
 (a) a valve body defining a valve chamber having a coaxial inlet port and vent port, and a side outlet port, and including confronting valve seats at said inlet and vent ports, and further including an axial extension surrounding said vent port;
 (b) a control valve element for said inlet valve seat;
 (c) a coaxial vent valve element for said vent valve seat;
 (d) said vent valve element being movable between its seat and an open position, and urged toward said vent port when the pressure in said valve chamber exceeds pressure externally of said valve;
 (e) a control stem screwthreaded into said valve body extension and engageable with said control valve element to close said control valve element against its seat, said control valve element tending to open in response to water pressure at said inlet, and, when open, being limited in its position by said valve stem;
 (f) and a handle attached to the outer end of said control stem and having a skirt surrounding said valve body extension to deflect fluids issuing through said vent port.

2. A valve, as defined in claim 1, wherein:
 (a) said vent port is annular and bordered radially inwardly and radially outwardly by a vent valve seat;
 (b) a valve stem extends from said control valve element through said radially inner vent valve seat;
 (c) said control stem is provided with a socket to receive said valve stem;
 (d) and said vent valve element is slidable on said valve stem, and sealingly engages both of said vent valve seats.

3. A valve, as defined in claim 1, wherein:
 (a) externally operated means includes an externally screwthreaded tubular member movable to and from said control valve element;
 (b) said vent valve port and vent valve seat are located within said control stem, said control stem is tubular;
 (c) said vent valve element is guided by said control stem;
 (d) and said control valve element includes a valve stem guided by said vent valve element.

References Cited

UNITED STATES PATENTS

| 2,133,804 | 10/1938 | Brooks | 137—218 |
| 2,290,145 | 7/1942 | Owens | 137—217 |
| 2,730,117 | 1/1956 | Svirsky | 137—217 |
| 2,971,525 | 2/1961 | Antunez | 137—217 |
| 3,171,424 | 3/1965 | Shames et al. | 137—218 |
| 3,172,128 | 3/1965 | Ducey | 137—218 X |
| 2,259,984 | 10/1941 | Anderson | 137—218 |

WILLIAM F. O'DEA, *Primary Examiner.*

D. H. LAMBERT, *Assistant Examiner.*

U.S. Cl. X.R.

251—82